United States Patent [19]

Massey et al.

[11] 4,046,350
[45] Sept. 6, 1977

[54] POWER ACTUATED VALVE

[75] Inventors: Roger G. Massey, Exeter; David G. Holloway, Concord, both of N.H.

[73] Assignee: The Parker & Harper Manufacturing Company, Inc., Worcester, Mass.

[21] Appl. No.: 708,698

[22] Filed: July 26, 1976

[51] Int. Cl.² ............................................. F16K 31/16
[52] U.S. Cl. .................................... 251/58; 403/356; 403/320; 137/556; 137/269
[58] Field of Search .................. 251/58; 403/355, 356, 403/320; 137/556, 269

[56] References Cited

U.S. PATENT DOCUMENTS

| 952,892 | 3/1910 | Etter | 403/320 X |
| 3,650,506 | 3/1972 | Bruton | 251/58 X |
| 3,982,725 | 9/1976 | Clark | 251/58 X |

Primary Examiner—Arnold Rosenthal
Attorney, Agent, or Firm—Thomas N. Tarrant

[57] ABSTRACT

A power actuated 90° rotation valve in which the power actuator is coupled to the valve stem by a socket which simultaneously engages a lug fixed with the valve stem and a nut threaded to said valve stem so that the nut cannot loosen during actuation of the valve.

10 Claims, 6 Drawing Figures

U.S. Patent  Sept. 6, 1977  4,046,350
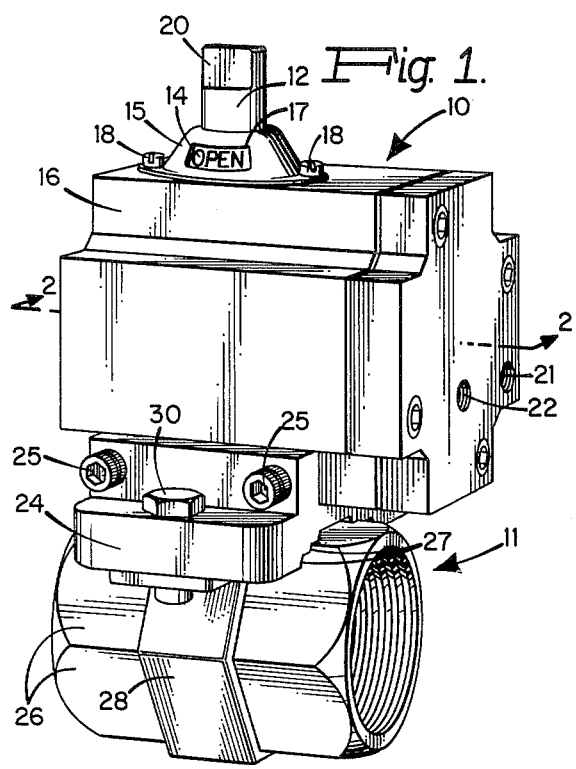
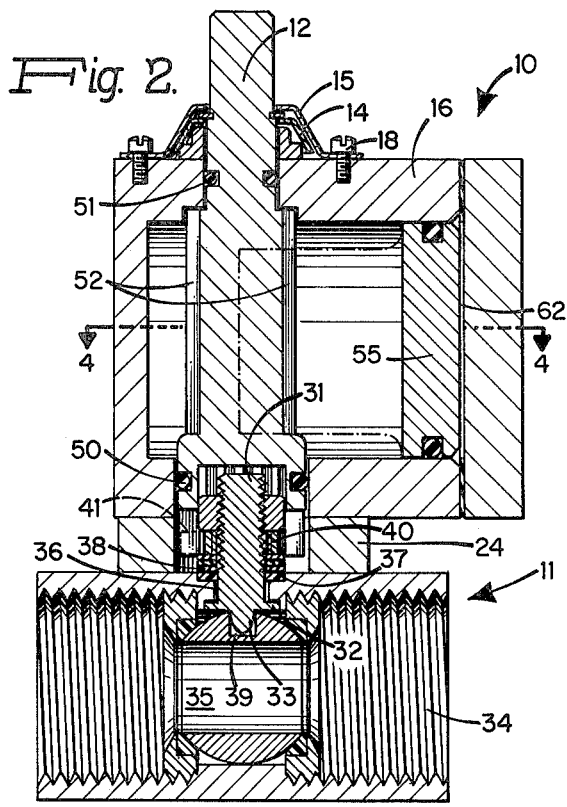
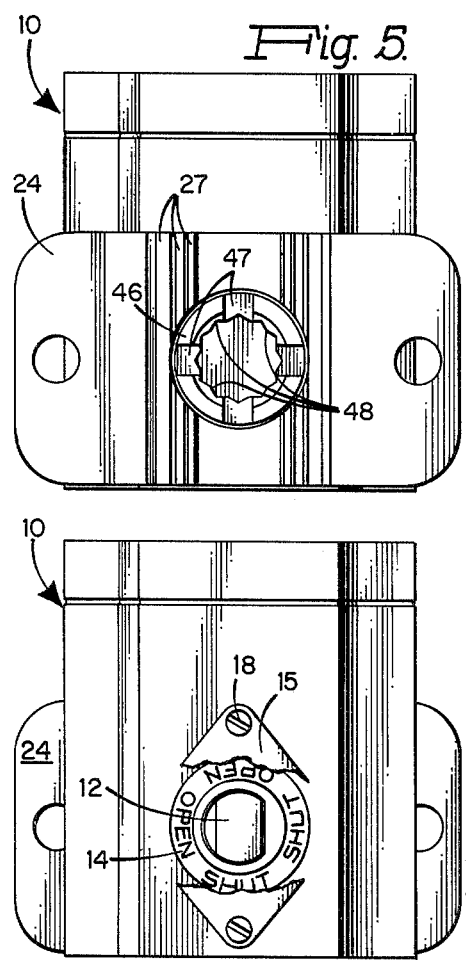
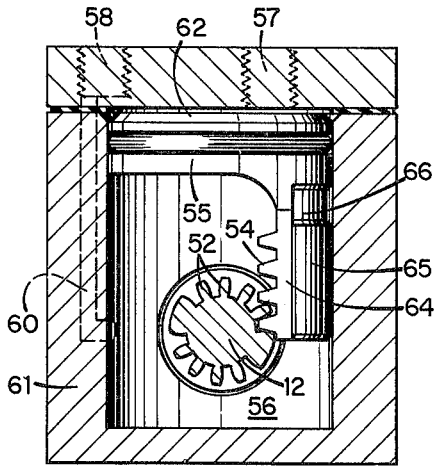
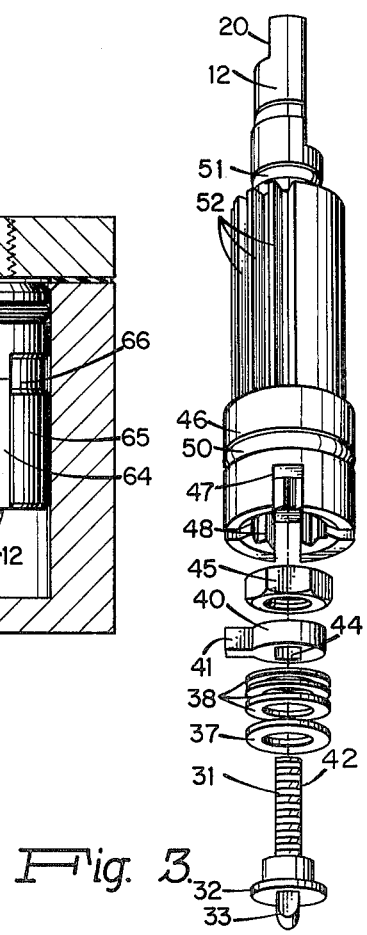

POWER ACTUATED VALVE

BACKGROUND OF THE INVENTION

1. Field of the Invention

The present invention relates to power actuated valves and in particular the coupling of the actuator to the valve.

2. Description of the Prior Art

Power actuators are available for many of the valves used in industry. These actuators are frequently powered by electric solenoids and by pneumatics. Hydraulic power is also used as are rotary electric motors. The power actuators are commonly designed to mate with valves that are also sold for manual operation. In power operation there is frequently a good deal of stress on valve stem and stem seal. Since the valve is not necessarily under human observation, a stem sometimes loosens resulting in improper operation and sometimes a lot of undesired spillage.

Both double acting and single acting power actuators are available. The double acting actuator provides controlled power for both on and off operation of the valve. The single acting actuator is normally powered in one direction only and has a spring return. Such actuators are normally designed so that they open a valve under power and shut it by the spring return. Sometimes, however, control systems are set up in reverse. With a power actuator it is not always easy to tell whether a valve is open or shut so it is common to add some kind of indicator. When a control system is set up to operate in reverse, it is necessary that the valve be open when at rest. This change is easily made with ball valves and the like that can be operated through 360° opening and closing at 90° intervals. However, the indicator gets reversed when the valve is rotated 90° to be open at the rest position.

SUMMARY OF THE INVENTION

In accordance with the present invention a power actuator is coupled to a valve stem by a socket which can be positioned over the valve stem assembly in any one of four 90° spaced positions. The external valve stem assembly includes a special washer with at least one projecting lug and a nut threaded onto the stem for holding the valve assembly together. The actuator socket engages both the lug and the nut. The special washer and stem are shaped to interlock so that one cannot rotate without the other. Since the lug and nut are both engaged by the socket and the stem cannot rotate without the lug, the stem cannot rotate without the nut either. This prevents the nut from loosening while turning the stem.

An indicator coupled to the actuator carries the indications of OPEN and SHUT as words, symbols or the like in a 360° ring reading by way of example, OPEN OPEN SHUT SHUT at 90° intervals. The indicator is coupled to the actuator shaft to rotate with the shaft. A cover over the indicator has a window exposing only one indication. If the indicator goes from open to shut when the shaft is turned clockwise, then reversing the indicator cover will cause it to go from shut to open with clockwise shaft rotation.

Thus the invention provides a valve and actuator combination in which the actuator may be connected to the valve stem in either a normally open or normally closed position, a coupling in the connection that locks the valve stem nut with the stem and an indicator that can be installed to read either for normally closed or normally open operation of the valve with valve rotation in the same direction for either case.

It is an object of the invention to provide a novel power actuated valve in which the actuator coupling locks a valve stem nut against loosening.

It is another object of the invention to provide a novel power actuated valve in which the actuator can be coupled to the valve stem for either normally open or normally closed operation and for rotation either clockwise or counterclockwise in going from open to shut with an indicator adaptable for any of the possible couplings.

Further objects and features of the invention will become apparent upon reading the following description together with the Drawing.

BRIEF DESCRIPTION OF THE DRAWING

FIG. 1 is a perspective view of a power actuated ball valve according to the invention.

FIG. 2 is a cross section along 2—2 of FIG. 1.

FIG. 3 is an exploded view of the stem assembly of FIG. 1.

FIG. 4 is a cross section taken along 4—4 of FIG. 2.

FIG. 5 is a bottom plan view of the actuator of FIG. 1 with the valve removed.

FIG. 6 is a top plan view of the actuator of FIG. 1.

DESCRIPTION OF THE PREFERRED EMBODIMENT

A complete actuator with valve assembly is depicted in FIG. 1. Valve actuator assembly 10 is mounted on top of ball valve 11. Actuator shaft 12 passes through actuator 10 and couples to valve 11 as depicted in FIG. 2. Indicator 14 mounted to shaft 12 carries the words "OPEN OPEN SHUT SHUT" in sequence around shaft 12. Cover 15 covers indicator 14 and is secured to body 16 of actuator 10. Cover 15 has window 17 facing one side to expose one of the indicator words. Cover 15 is mounted to body 16 by two screws 18. Window 17 can be rotated to face the opposite side of actuator 10 by removing screws 18. With cover 15 facing the opposite side, the words "OPEN" and "SHUT" turn up in the reverse sequence for a 90° rotation of shaft 12. The upper end of shaft 12 has one face 20 cut flat for securing a manual handle. Ports 21 and 22 are located in one end of body 16 for fluid pressure connections. Mounting plate 24 is connected to the bottom of actuator assembly 10 by screws 25 and is positioned centered under shaft 12. Valve 11 has six sides 26, one of which fits ridges 27 in the bottom of plate 24. Mounting strap 28 fits around the remaining sides of valve 11 and is bolted to mounting plate 24 by bolts 30.

FIG. 2 is a section taken along 2—2 of FIG. 1 and depicts shaft 12 extending through body 16 and coupling to stem 31 of valve 11. Stem 31 has an enlarged sealing surface 32 inside of valve body 34. This type of stem can only be inserted from the inside with ball 35 removed since aperture 36 in body 34 is smaller than sealing surface 32. Tab 33 projecting from the bottom of stem 31 mates with slot 39 in ball 35 for turning the ball.

On top of surface 32 is washer 37 made, for example, of teflon to provide a tight seal and a bearing surface at the same time. On the outside of valve body 34, stack of washers 38 is positioned over valve stem 31. The bottom washer of washers 38 is made of a similar material to that of washer 37, for example teflon. All together four washers are depicted in stack 38, but the number can be adjusted for spacing purposes. On top of washer stack 38 is special washer 40 having tang 41 projecting from its circumference.

As can be better seen in exploded view FIG. 3, the upper part 42 of stem 31 is a threaded cylindrical portion in which the threads have been ground off to provide two flat sides. Washer 40 has a central aperture 44 matching part 42 of stem 31 so that it cannot rotate relative to the stem. Nut 45 threads down over part 42 of stem 31 to secure the stem assembly.

Coupling socket 46 forms the bottom of shaft 12 and fits over nut 45 and washer 40. Slots 47 also depicted in FIG. 5, receive tang 41 in any of four 90° displaced positions. The inside walls of socket 46 between slots 47 and extending above slots 47 define a twelve-point socket for engaging nut 45. Socket points 48 are depicted in FIGS. 3 and 5 and are the same as usually found in a mechanic's socket wrench that would fit nut 45. The depth of socket 46 and of slots 47 are made greater than necessary to accommodate variations in the stack height of washers 38 along with washer 40 and nut 45.

Shaft 12 is sealed in body 16 by 0-ring 50 resting in a groove in the outside wall of socket 46, and 0-ring 51 in a groove of the upper portion of shaft 12.

In between 0-rings 50 and 51, shaft 12 carries vertical gear teeth 52 for engaging gear teeth 54 of piston 55. The meshing of these gear teeth is illustrated in FIG. 4. Piston 55 is positioned in cylindrical chamber 56 inside body 16 and is forced back and forth by fluid pressure to drive shaft 12 in rotation.

Fluid pressure connections 57 and 58 are provided at one end of body 16. Pressure provided at connection 57 centrally located at one end of body 16 forces piston 55 downward as viewed in FIG. 4. Pressure connection 58 is coupled through bore 60 in wall 61 of body 16 providing a passage to the opposite end of chamber 56. Pressure provided through this connection thus forces piston 55 back upward with reference to FIG. 4. The length of chamber 56 is accurately dimensioned so that the movement of piston 55 produces substantially a 90° rotation of ball 35.

Piston 55 includes a cylindrical piston head 62 and a leg 64 carrying gear teeth 54. Referring to FIG. 4, the bottom end of leg 64 has a bearing surface 65 against wall 61 of body 16. This bearing surface maintains teeth 54 engaged with teeth 52 of shaft 12. Piston head 62 also engages wall 61 to provide a fluid seal. In between piston head 62 and bearing surface 65, the outside portion of leg 64 carries a tapered recess 66. In manufacture, tapered recess 66 is packed with lubricating grease which gradually feeds out over the tapered surface to maintain lubrication of bearing surface 65.

FIG. 5 is a bottom plan view of actuator 10 showing mounting plate 24. Mounting plate 24 has series of ridges 27 to accept different sizes of valves 11. As depicted, there are four sets of ridges to mate with four different sizes of valve bodies.

FIG. 6 is a top plan view of actuator 10 showing indicator 14 with cover 15 removed. It will be seen that the indications of "SHUT" and "OPEN" arranged around indicator 14 are such that when it indicates "SHUT" on one side it indicates "OPEN" on the other. With a 90° rotation of shaft 12, it can be seen that the indication at the opposite sides will reverse. Thus, in order to reverse the sense of operation, valve 11 can be disconnected and valve stem 31 rotated 90°. Then with actuator 10 reassembled to valve 11, cover 15 is removed by unscrewing two screws 18 and is reversed so that the window in cover 15 exposes the opposite indication of indicator 14.

While the present invention has been described with relation to a specific actuator and valve, it is not the intention to be limited thereby. The actuator can be a spring return actuator instead of double acting or it can use two opposed pistons instead of one or it may be actuated by some other type of power drive than fluid pressure against a piston. Likewise, the valve may be a plug valve or butterfly valve or any other type of valve using 90° rotation for operation.

Thus it is intended to cover the invention within the scope of the following claims.

We claim:

1. In a power actuated valve comprising a valve operable from fully open to fully closed position by ninety degree rotation of a valve stem, a power actuator for rotating said valve stem and coupling means to couple said actuator to said valve stem, the combination in said coupling means comprising:
   a. a washer having at least one laterally protruding lug fitted over said valve stem;
   b. a nut threaded over said valve stem on top of said washer;
   c. a socket connected to said actuator for rotation thereby having at least one slot in its sidewall for receiving said lug and a series of points on its inner sidewall for engaging said nut; and,
   d. means to clamp said actuator to said valve to secure said socket over said stem.

2. In a power actuated valve according to claim 1, the combination in which said at least one slot is four slots spaced at 90° intervals whereby said socket can receive said valve stem at any one of four 90° spaced positions.

3. In a power actuated valve according to claim 1, the combination in which said series of points consists of 12 points to provide a 12-point socket.

4. In a power actuated valve according to claim 1, the combination wherein said means to clamp comprises a mounting plate secured to said actuator and a strap around said valve secured to said plate.

5. In a power actuated valve according to claim 4, the combination wherein said mounting plate carries a plurality of ridges for engaging valve bodies of different sizes.

6. A power actuated valve operating from fully closed to fully open by 90° rotation comprising:
   a. a power actuator in a first body;
   b. a gear driven rotatable shaft passing entirely through said first body to provide the output of said actuator;
   c. an indicator at a first end of said shaft outside of said first body;
   d. a socket coupling at a second end of said shaft;
   e. a valve in a second body;
   f. a valve stem extending from said second body and secured thereto by an external nut;
   g. a shaped washer having at least one extending tang secured to said stem under said nut; and,
   h. mounting means for clamping said first body to said second body with said socket engaging both said tang and said nut.

7. A power actuated valve according to claim 6 wherein said indicator comprises an indicator plate secured to said shaft and carrying indicia representing open and shut in the sequence. "OPEN OPEN SHUT SHUT" spaced at 90° intervals around said shaft.

8. A power actuated valve according to claim 7 wherein a cover is secured to said first body covering said indicator plate and exposing one of said indicia, said cover being reversible so that it can be secured in either of two 180° reversed positions.

9. A power actuated valve according to claim 8 wherein said socket carries four slots for accepting said tang in four ninety degree displaced positions of rotation.

10. A power actuated valve according to claim 9 wherein said socket is a 12-point socket for engaging said nut in a plurality of displaced positions of rotation.

* * * * *